US009434632B2

(12) United States Patent
Amosov et al.

(10) Patent No.: US 9,434,632 B2
(45) Date of Patent: *Sep. 6, 2016

(54) GLASS FORMING APPARATUS AND METHOD

(71) Applicant: Corning Incorporated, Corning, NY (US)

(72) Inventors: Alexey Sergeyevich Amosov, Gatchina (RU); Olus Naili Boratav, Ithaca, NY (US); Frank Coppola, Horseheads, NY (US); Vladislav Yuryevich Golyatin, Avon (FR); Steven Michael Milillo, State College, PA (US); George Clinton Shay, Hardy, VA (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,775

(22) Filed: Feb. 24, 2014

(65) Prior Publication Data

US 2014/0238079 A1 Aug. 28, 2014

Related U.S. Application Data

(60) Provisional application No. 61/769,256, filed on Feb. 26, 2013.

(51) Int. Cl.
*C03B 17/02* (2006.01)
*C03B 17/06* (2006.01)

(52) U.S. Cl.
CPC ............. *C03B 17/02* (2013.01); *C03B 17/064* (2013.01)

(58) Field of Classification Search
CPC .................. C03B 17/064; C03B 17/02
See application file for complete search history.

(56) References Cited

U.S. PATENT DOCUMENTS

| 2,052,269 | A |   | 8/1936 | Woods | ........................ 49/17.1 |
| 3,149,949 | A | * | 9/1964 | Dockerty | .............. C03B 17/064 65/121 |
| 3,338,696 | A | * | 8/1967 | Dockerty | .............. C03B 17/064 65/121 |
| 3,589,887 | A | * | 6/1971 | Ward | ................... C03B 17/064 65/121 |
| 3,607,182 | A | * | 9/1971 | Leibowitz | ............. C03B 17/064 65/195 |
| 4,204,027 | A | * | 5/1980 | Simon | ...................... C03B 5/26 428/428 |
| 4,214,886 | A | * | 7/1980 | Shay | ........................ C03B 5/26 65/121 |

(Continued)

FOREIGN PATENT DOCUMENTS

| EP | 2065345 | 6/2009 | ............. C03B 17/06 |
| GB | 2163740 | 3/1986 | ............. C03B 17/00 |

OTHER PUBLICATIONS

International Search Report and Written Opinion dated May 27, 2014, International Application No. PCT/US2014/018140, International Filing Date Feb. 25, 2014.

*Primary Examiner* — Jason L Lazorcik
(74) *Attorney, Agent, or Firm* — Matthew J. Mason

(57) ABSTRACT

A glass forming apparatus and method include a weir on at least a first side of a molten core glass reservoir. The weir includes an inclined surface that, in the intended direction of molten glass flow, slopes downward in the vertical direction while extending away from the molten core glass reservoir in the horizontal direction. A source of molten clad glass is configured above the glass forming apparatus such that when molten clad glass is flowing down and molten core glass is flowing over the weir, the molten clad glass drops onto the molten core glass at a highest upstream contact point that is located directly above the inclined surface of the weir.

23 Claims, 6 Drawing Sheets

(56) References Cited

U.S. PATENT DOCUMENTS

| | | | |
|---|---|---|---|
| 6,997,017 B2* | 2/2006 | Pitbladdo | C03B 17/064 65/195 |
| 7,514,149 B2 | 4/2009 | Bocko et al. | 428/426 |
| 8,007,913 B2 | 8/2011 | Coppola et al. | 428/426 |
| 8,359,887 B2* | 1/2013 | Bisson | C03B 17/06 65/101 |
| 8,646,291 B2 | 2/2014 | Coppola et al. | |
| 2004/0093900 A1* | 5/2004 | Fredholm | C03B 17/064 65/25.3 |
| 2004/0197575 A1* | 10/2004 | Bocko | B32B 17/06 428/432 |
| 2005/0268659 A1* | 12/2005 | Rhoads | C03B 17/064 65/53 |
| 2006/0127679 A1* | 6/2006 | Gulati | B32B 17/06 428/426 |
| 2011/0318555 A1* | 12/2011 | Bookbinder | C03B 17/02 428/213 |
| 2014/0238078 A1* | 8/2014 | Boek | C03C 15/00 65/30.14 |
| 2014/0318182 A1* | 10/2014 | Coppola | C03B 17/067 65/29.21 |
| 2015/0030827 A1* | 1/2015 | Gomez | C03C 21/002 428/212 |
| 2015/0037552 A1* | 2/2015 | Mauro | C03C 3/089 428/212 |
| 2015/0051061 A1* | 2/2015 | Kiczenski | B32B 17/00 501/37 |

* cited by examiner

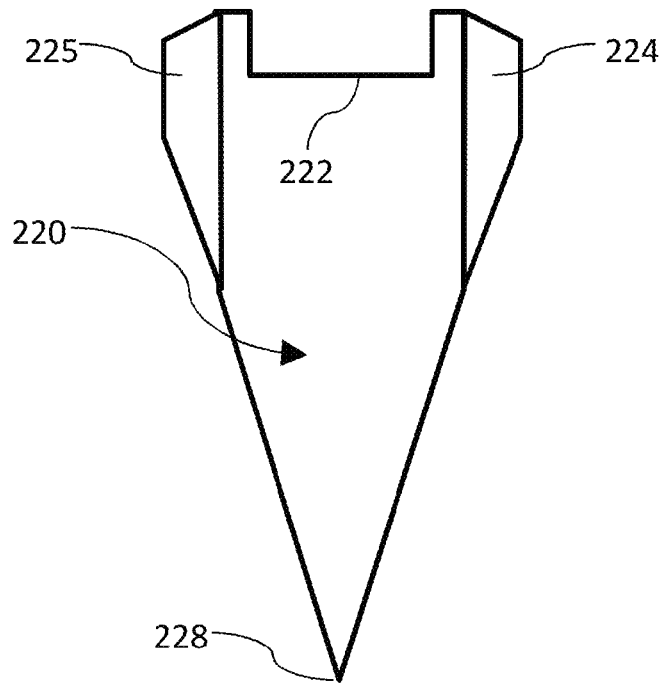
FIG. 3A
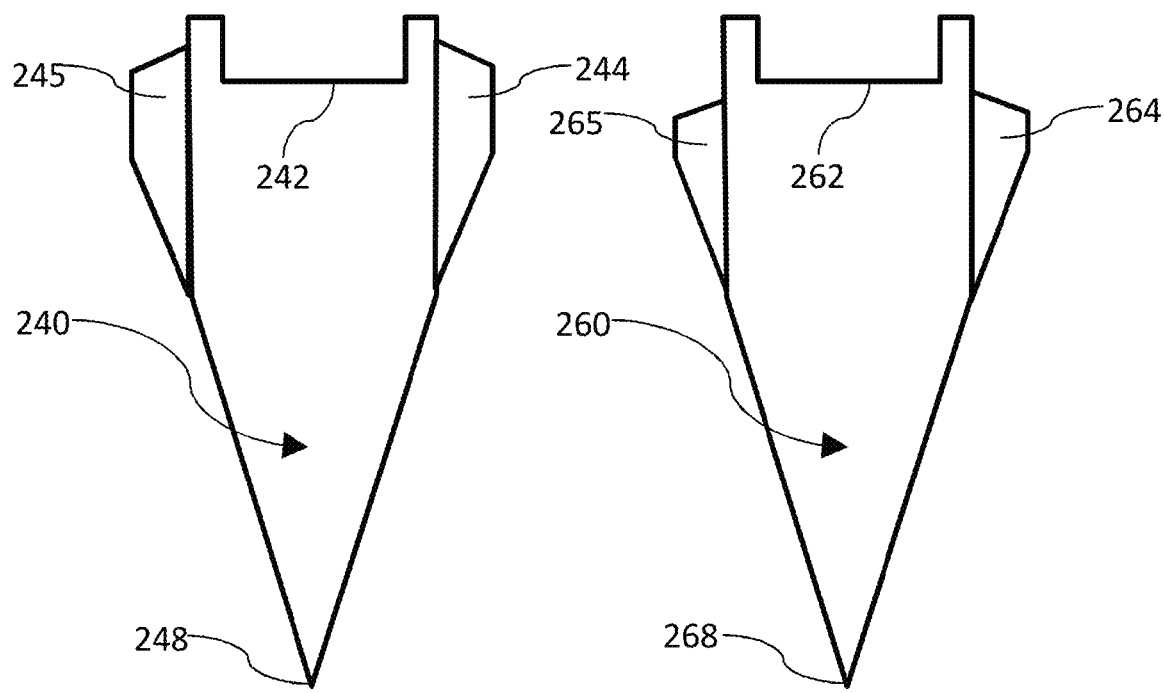
FIG. 3B
FIG. 3C

GLASS FORMING APPARATUS AND METHOD

CROSS-REFERENCE TO RELATED APPLICATIONS

This application claims the benefit of priority under 35 U.S.C. §119 of U.S. Provisional Application Ser. No. 61/769,256 filed on Feb. 26, 2013.

BACKGROUND

The disclosure relates generally to an apparatus and method for forming glass sheets and more particularly to an apparatus and method for forming glass sheets in laminate fusion glass manufacture.

It has been known that laminated glass sheets can be manufactured in a fusion draw process by flowing a clad layer of molten glass over a molten core layer of glass, such as, for example as disclosed in U.S. Pat. No. 4,214,886, the entire disclosure of which is incorporated herein by reference. However, if the flow of the two glass streams are not carefully controlled, unwanted or uneven flow configurations can result. Moreover, air can become undesirably entrapped in the interface between the molten glass streams and/or result in pulsation of the clad stream, resulting in uneven thickness distribution of the final sheet.

SUMMARY

One embodiment of the disclosure relates to a glass forming apparatus. The apparatus includes a molten core glass reservoir extending along a length of the apparatus. The apparatus also includes a weir on at least a first side of the molten core glass reservoir. The weir includes an inclined surface that, in the intended direction of molten glass flow, slopes downward in the vertical direction while extending away from the molten core glass reservoir in the horizontal direction. Along at least one cross section of the weir, the horizontal distance (A) between the closest and farthest points of the inclined surface from the molten core glass reservoir is greater than half the horizontal distance (B) between the molten core glass reservoir and the farthest point of the inclined surface from the molten glass reservoir. A source of molten clad glass is configured above the glass forming apparatus such that when molten clad glass is flowing down from the source of molten clad glass and molten core glass is flowing over the weir, the molten clad glass drops onto the molten core glass at a highest upstream contact point, the highest upstream contact point being located directly above the inclined surface of the weir.

Another embodiment of the disclosure relates to a method of forming glass sheets. The method includes flowing molten core glass from a molten core glass reservoir extending along a length of a glass forming apparatus over a weir on at least a first side of the molten core glass reservoir. The method also includes flowing molten clad glass down from a source of molten clad glass. The weir includes an inclined surface that, in the intended direction of molten glass flow, slopes downward in the vertical direction while extending away from the molten core glass reservoir in the horizontal direction. Along at least one cross section of the weir, the horizontal distance (A) between the closest and farthest points of the inclined surface from the molten core glass reservoir is greater than half the horizontal distance (B) between the molten core glass reservoir and the farthest point of the inclined surface from the molten glass reservoir. The source of molten clad glass is configured above the glass forming apparatus such that when molten clad glass is flowing down from the source of molten clad glass and molten core glass is flowing over the weir, the molten clad glass drops onto the molten core glass at a highest upstream contact point, the highest upstream contact point being located directly above the inclined surface of the weir.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 3A-C illustrate cross-sectional elevation views of lower core fusion pipes according to embodiments disclosed herein;

DETAILED DESCRIPTION

The fusion laminate process as disclosed in U.S. Pat. No. 4,214,886, the entire disclosure of which is incorporated herein by reference, combines two glasses of different compositions into a two (2) or three (3)-layered laminated sheet. It has been determined by, for example, oil model simulation, liquid polymer simulation, mathematical modeling, and observation, that the drop distance of the glass stream or flow from the upper pipe, which provides the source of the cladding glass or outer layer glass, onto the glass in the lower pipe, which provides the source of the core glass, is significant in maintaining excellent glass quality of the final laminated sheet. It is generally believed that the velocity of the two liquid glass streams when they come together must be nearly equal. The drop distance, coupled with the liquid glass viscosity, establishes the velocity of the upper glass stream.

Figure 1A:
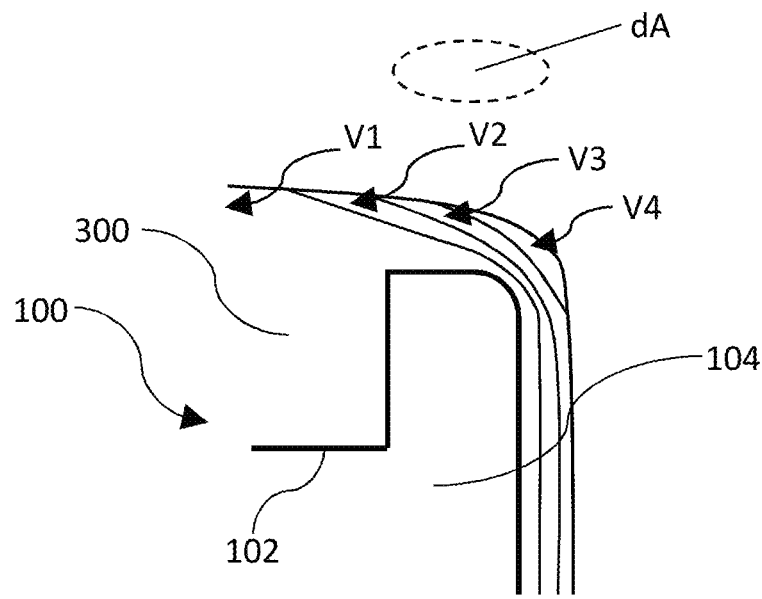
FIG. 1A illustrates a cross-sectional elevation view of a weir of a lower core fusion pipe according to the prior art, showing a velocity profile of molten core glass flowing thereover.

The velocity of the lower glass stream, in turn, is at least in part a function of the liquid glass viscosity coupled with the geometry of the weir of the lower pipe as well as the location of the glass flow relative to the weir. FIG. 1A, illustrates a cross-sectional elevation view of a weir of a lower core fusion pipe 100 according to the prior art, showing a velocity profile of molten core glass 300 flowing thereover. Lower core fusion pipe 100 includes a molten core glass reservoir 102 containing molten core glass 300 and a weir 104 on at least a first side of the molten core glass reservoir 102. The relative velocity of the molten core glass 300 is shown in FIG. 1A in four different velocity regimes, with the area indicated by V1 as representing the relatively slowest flow velocity of the molten core glass, the area indicated by V2 as representing a faster flow velocity of molten core glass than V1, the area indicated by V3 as representing a faster flow velocity of molten core glass than V2, and the area indicated by V4 as representing a faster flow velocity of molten core glass than V3. As can be seen from FIG. 1A, the horizontal width of each of these flow velocity regimes, from the perspective of a drop area dA immediately above the flow front, is relatively narrow.

Figure 1B:
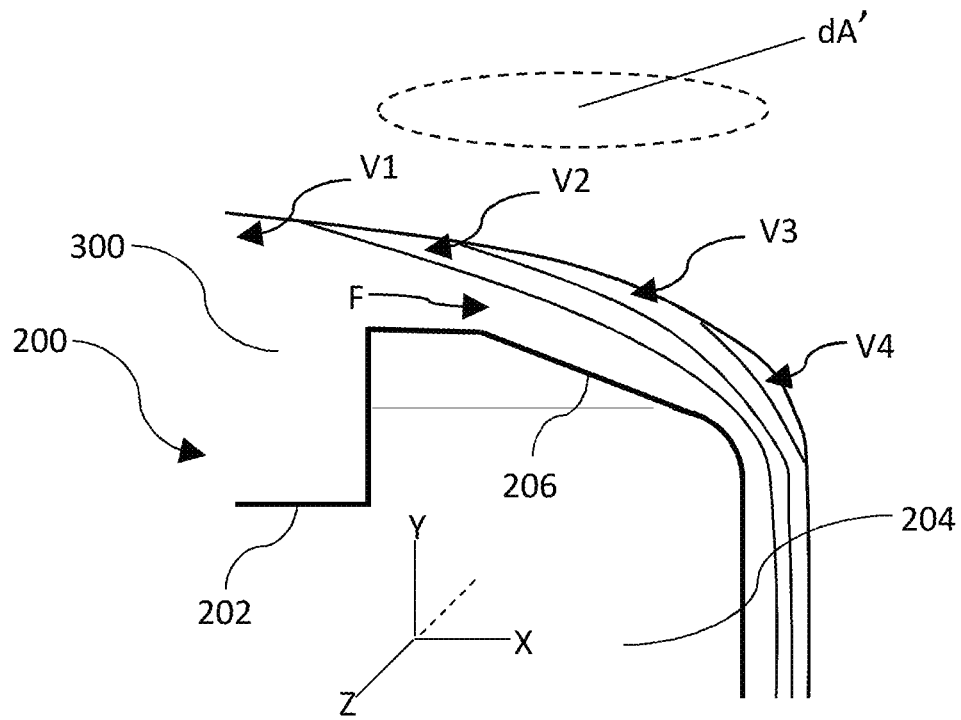
FIG. 1B illustrates a cross-sectional elevation view of a of a weir of a lower core fusion pipe according to at least one embodiment disclosed herein, showing a velocity profile of molten core glass flowing thereover.

In contrast to FIG. 1A, FIG. 1B, illustrates a cross-sectional elevation view of a of a weir of a lower core fusion pipe 200 according to at least one embodiment disclosed herein, showing a velocity profile of molten core glass 300 flowing thereover. Lower core fusion pipe 200 includes a molten core glass reservoir 202 containing molten core glass 300 and a weir 204 on at least a first side of the molten core glass reservoir 202. Weir 204 includes an inclined surface 206 that, in the intended direction of molten glass flow F, slopes downward in the vertical direction Y while extending away from the molten core glass reservoir in the horizontal direction X. The relative velocity of the molten core glass 300 is shown in FIG. 1B in four different velocity regimes, with the area indicated by V1 as representing the relatively slowest flow velocity of the molten core glass, the area indicated by V2 as representing a faster flow velocity of molten core glass than V1, the area indicated by V3 as representing a faster flow velocity of molten core glass than V2, and the area indicated by V4 as representing a faster flow velocity of molten core glass than V3. As can be seen from FIG. 1B, the horizontal width of each of these flow velocity regimes, from the perspective of a drop area dA' immediately above the flow front, is relatively wide when compared to the width of the velocity flow regimes of FIG. 1A.

Figure 2A:
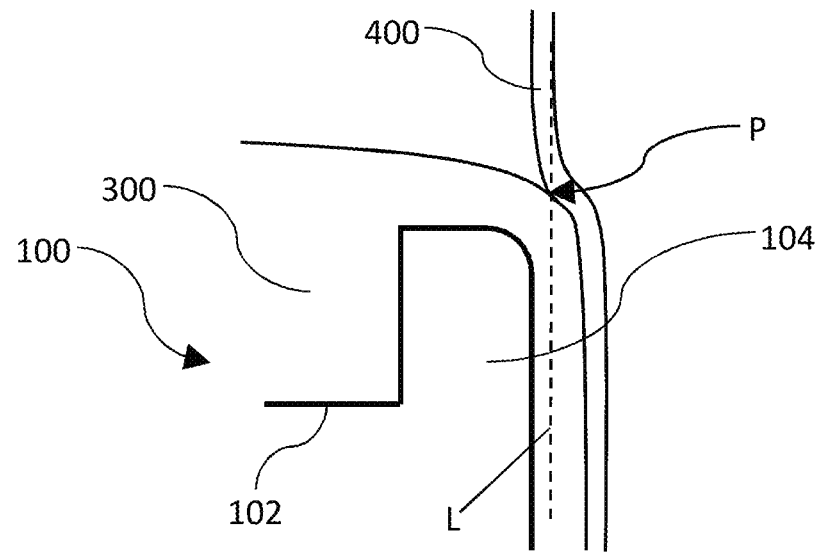
FIG. 2A illustrates a cross-sectional elevation view of a weir of a lower core fusion pipe according to the prior art, showing molten clad glass dropping and flowing over molten core glass.

FIG. 2A illustrates a cross-sectional elevation view of a weir 104 of a lower core fusion pipe 100 according to the prior art, showing molten clad glass 400 dropping and flowing over molten core glass 300. Molten clad glass 400 drops and flows over molten core glass 300 as the result of a source of molten clad glass, such as a clad glass pipe (not shown), being configured above the apparatus comprising the lower core fusion pipe 100. When molten clad glass 400 is flowing down from the source of molten clad glass and molten core glass 300 is flowing over the weir 104, as shown in FIG. 2A, the molten clad glass 400 drops onto the molten core glass 300 at a highest upstream contact point P.

Figure 2B:
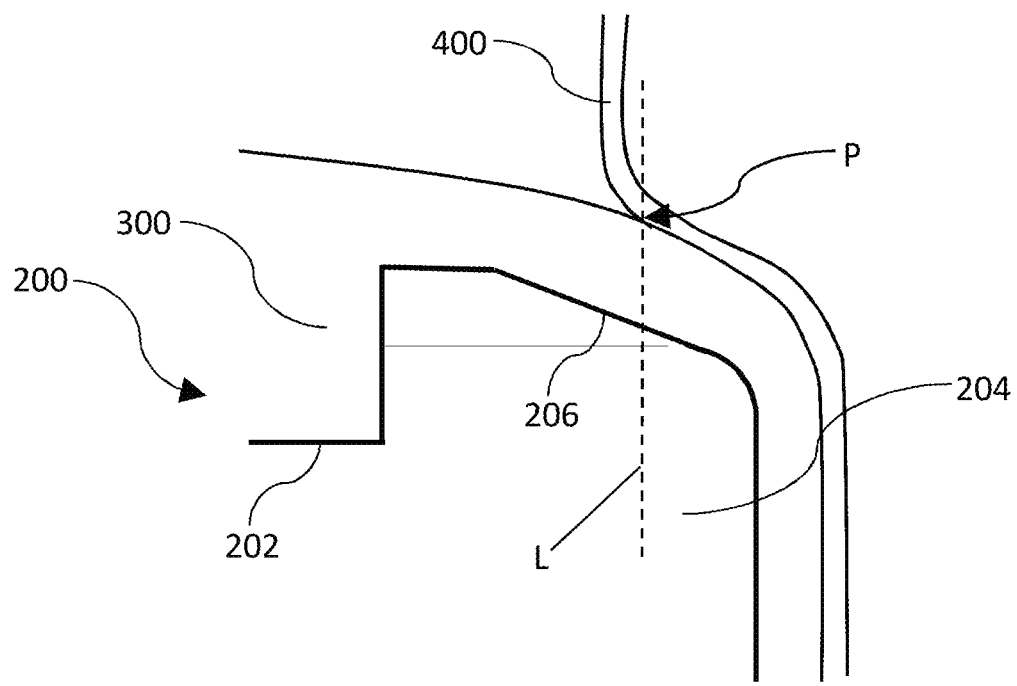
FIG. 2B illustrates a cross-sectional elevation view of a weir of a lower core fusion pipe according to at least one embodiment disclosed herein, showing molten clad glass dropping and flowing over molten core glass.

FIG. 2B, in contrast, illustrates a cross-sectional elevation view of a weir 204 of a lower core fusion pipe 200 according to at least one embodiment disclosed herein (i.e., the same embodiment as shown in FIG. 1B), showing molten clad glass 400 dropping and flowing over molten core glass 300. Molten clad glass 400 drops and flows over molten core glass 300 as the result of a source of molten clad glass, such as a clad glass pipe (not shown), being configured above the apparatus comprising the lower core fusion pipe 200. When molten clad glass 400 is flowing down from the source of molten clad glass and molten core glass 300 is flowing over the weir 204, as shown in FIG. 2B, the molten clad glass 400 drops onto the molten core glass 300 at a highest upstream contact point P. As indicated by vertical line L, highest upstream contact point P is located directly above inclined surface 206 of the weir 204.

In the embodiment shown in FIGS. 1B and 2B, along at least one cross section of the weir, the horizontal distance between the closest and farthest points of the inclined surface from the molten core glass reservoir is at least half the horizontal distance between the molten core glass reservoir and the farthest point of the inclined surface from the molten glass reservoir. This will be described in greater detail below with respect to FIG. 4A.

FIGS. 3A-3C, illustrate cross-sectional elevation views of lower core fusion pipes, 220, 240, and 260, respectively, according to embodiments disclosed herein. Each of lower core fusion pipes 220, 240, and 260, respectively includes a first weir 224, 244, and 264, on a first side of a molten glass reservoir, 222, 242, and 262, and a second weir 225, 245, and 265, on a second side of the molten glass reservoir. In each of lower core fusion pipes 220, 240, and 260, the weir on the first side of the molten glass reservoir and the weir on the second side of the molten glass reservoir converge to form a root 228, 248, and 268, respectively. The portion of the weir that includes the inclined surface (e.g., shown as 206 in FIGS. 1B and 2B), may be, in any of the embodiments disclosed herein (including those illustrated in FIGS. 3A-3C) integral to the lower core fusion pipe (such that the portion of the weir that includes the inclined surface and the lower core fusion pipe are one unitary body) or, alternatively, affixed from a separate piece of material as a sub-component of the weir. When affixed from a separate piece of material, the material may be the same or different as material from which the lower core fusion pipe is comprised. Materials can be selected from any suitable material for high temperature glass processing, including, but not limited to platinum, zircon, other high temperatures metals and metal alloys, various ceramics, and combinations thereof.

Figure 4A:
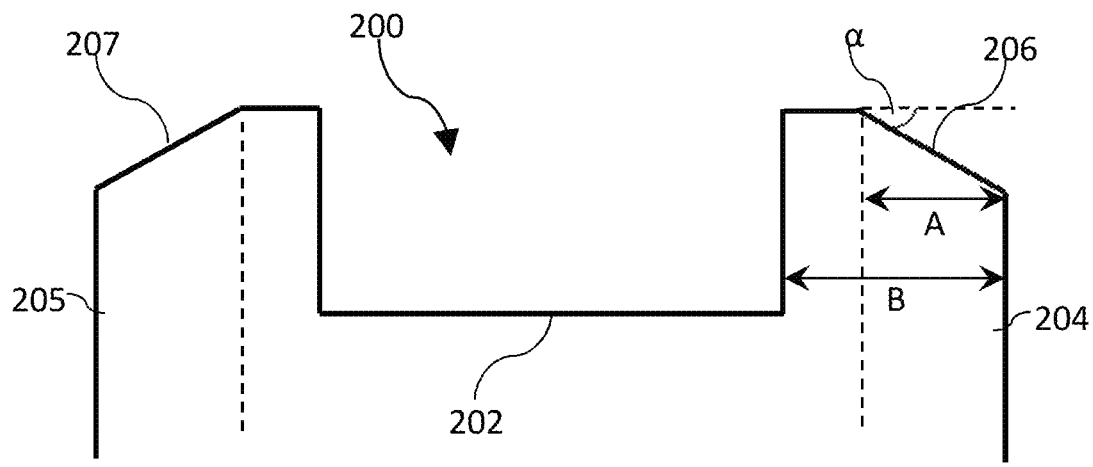
FIGS. 4A-4B illustrate cross-sectional elevation views of weirs and molten core glass reservoirs of lower core fusion pipes according to embodiments disclosed herein.

FIGS. 4-A-4B illustrate cross-sectional elevation views of weirs and molten core glass reservoirs of lower core fusion pipes according to embodiments disclosed herein. Specifically, FIG. 4A illustrates a cross-sectional elevation view of a lower core fusion pipe 200 that corresponds to the embodiment shown in FIGS. 1B and 2B, having molten core glass reservoir 202, first weir 204 on a first side of molten glass reservoir 202 and second weir 205 on s second side of molten core glass reservoir 202. Each of first weir 204 and second weir 205 includes an inclined surface, 206, 207, that, in the intended direction of molten glass flow, slopes downward in the vertical direction while extending away from the molten core glass reservoir in the horizontal direction. As illustrated in the cross-sectional view of FIG. 4A, the horizontal distance between the closest and farthest points of inclined surface 206 from molten core glass reservoir 202 is indicated by A, whereas the horizontal distance between molten core glass reservoir 202 and the farthest point of inclined surface 206 from molten core glass reservoir 202 is indicated by B. As can be seen in FIG. 4A, the horizontal distance A between the closest and farthest points of inclined surface 206 from molten core glass reservoir 202 is greater than half the horizontal distance B between molten core glass reservoir 202 and the farthest point of inclined surface 206 from molten glass reservoir 202.

For example, if horizontal distance B is 4 inches, horizontal distance A is greater than 2 inches, such as at least 2.5 inches, and further such as at least 3 inches, including, for example, from 2.5 inches to 3.5 inches.

By way of further example, in certain exemplary embodiments, horizontal distance A is at least 60% of horizontal distance B, including at least 70% of horizontal distance B, and further including at least 80% of horizontal distance B, and still further including at least 90% of horizontal distance B. In certain exemplary embodiments, the ratio of horizontal distance A, to horizontal distance B is at least 1.1:2, such as at least 1.3:2, and further such as at least 1.5:2, including from 1.1:2 to 1.9:2, and from 1.3:2 to 1.7:2.

Figure 4B:
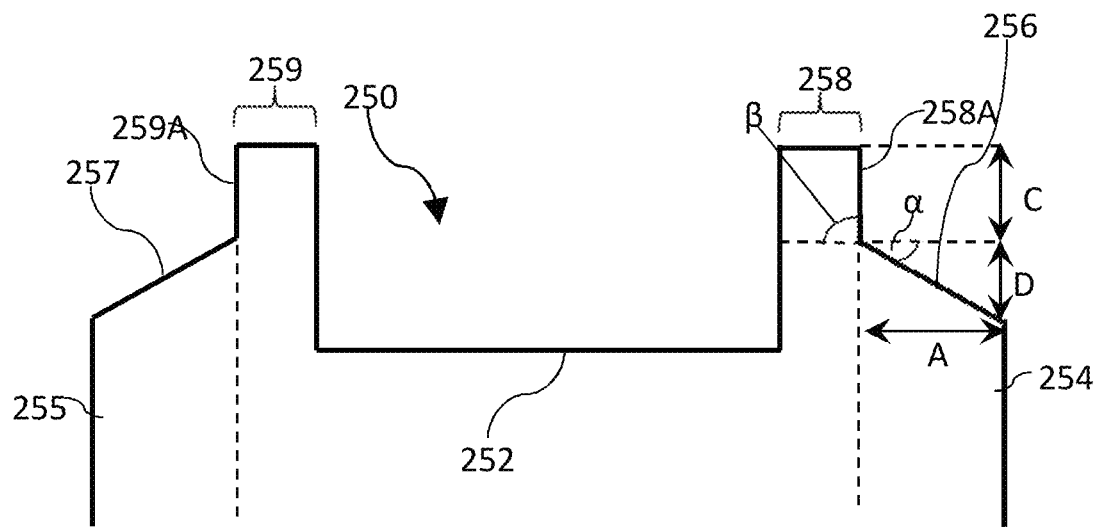

FIG. 4B illustrates a cross-sectional elevation view of an alternative embodiment of an apparatus comprising a lower core fusion pipe 250, having molten core glass reservoir 252, first weir 254 on a first side of molten glass reservoir 252 and second weir 255 on s second side of molten core glass reservoir 252. Each of first weir 254 and second weir 255 includes an inclined surface, 256, 257, that, in the intended direction of molten glass flow, slopes downward in the vertical direction while extending away from the molten core glass reservoir in the horizontal direction. In addition, each of first weir 254 and second weir 255 include a stepped surface region 258, 259 between the inclined surface 256, 257 and the molten core glass reservoir 252. Each of stepped surface region 258, 259 includes a downstep surface 258A, 259A. Each of downstep surfaces 258A, 259A has an average degree of incline $\beta$ that is greater than an average degree of incline $\alpha$ of the inclined surface.

While not limited to any particular value, the average degree of incline $\alpha$ of the inclined surface can, for example, be at least 5 degrees, such as at least 10 degrees, and further such as at least 20 degrees, and yet further such as at least 30 degrees. The average degree of incline $\alpha$ can also be less than 60 degrees, such as less than 50 degrees, and further such as less than 40 degrees, and still further such as less than 30 degrees, and still yet further such as less than 20 degrees, and even still yet further such as less than 10 degrees. For example, the average degree of incline $\alpha$ can range from 5 degrees to 45 degrees, such as from 10 degrees to 40 degrees, and further such as from 15 degrees to 35 degrees, and yet further such as from 20 degrees to 30 degrees.

While not limited to any particular value, the average degree of incline $\beta$ of the downstep surface can, for example, be at least 45 degrees, such as at least 60 degrees, and further such as at least 75 degrees, and yet further such as at least 90 degrees. For example, the average degree of incline $\beta$ of the downstep surface can range from 45 to 90 degrees, such as from 60 to 90 degrees, and further such as from 75 to 90 degrees, including about 90 degrees.

While not limited to any particular value, the difference in average degree of incline between the average degree of incline $\alpha$ of the inclined surface and the average degree of incline $\beta$ of the downstep surface can, for example, be at least 5 degrees, such as at least 25 degrees, and further such as at least 45 degrees, and still further such as at least 65 degrees, and still yet further such as at least 85 degrees. For example, the difference in average degree of incline between the average degree of incline $\alpha$ of the inclined surface and the average degree of incline $\beta$ of the downstep surface can, for example, range from 5 degrees to 85 degrees, such as from 20 degrees to 70 degrees, and further such as from 30 degrees to 60 degrees.

As illustrated in FIG. 4B, a vertical distance between the highest and lowest points of downstep surface 258A is indicated by C, whereas a vertical distance between the highest and lowest points of inclined surface 256 is indicated by D. In the embodiment illustrated in FIG. 4B, vertical distance C between the highest and lowest points of downstep surface 258A, is greater than vertical distance D between the highest and lowest points of inclined surface 256. However, alternative embodiments can include those in which vertical distance C and D are equal or those in which vertical distance D is greater than vertical distance C.

In addition, in the embodiment illustrated in FIG. 4B, vertical distance C between the highest and lowest points of downstep surface 258A is less than horizontal distance A between the closest and farthest points of inclined surface 256 from molten core glass reservoir 252. However, alternative embodiments can include those in which vertical distance C is equal to horizontal distance A or those in which vertical distance C is greater than horizontal distance A, such as the embodiment illustrated in FIG. 3C.

By way of further example, in certain exemplary embodiments, vertical distance D is at least 10% of vertical distance C, including at least 25% of vertical distance C, and further including at least 50% of vertical distance C, and still further including at least 75% of vertical distance C. In certain exemplary embodiments, vertical distance D is less than 90% of vertical distance C, such as less than 75% of vertical distance C, and further such as less than 50% of vertical distance C. In certain exemplary embodiments, the ratio of vertical distance D, to vertical distance C is from 1:10 to 2:1, such as from 1:5 to 1:1, and further such as 1:2 to 1:1.2.

By way of further example, in certain exemplary embodiments, vertical distance C is at least 10% of horizontal distance A, including at least 25% of horizontal distance A, and further including at least 50% of horizontal distance A, and still further including at least 75% of horizontal distance A. In certain exemplary embodiments, vertical distance C is less than 90% of horizontal distance A, such as less than 75% of horizontal distance A, and further such as less than 50% of horizontal distance A. In certain exemplary embodiments, the ratio of vertical distance C, to horizontal distance A is from 1:10 to 3:1, such as from 1:5 to 2:1 and further such as from 1:2 to 1:1.

Figure 5:
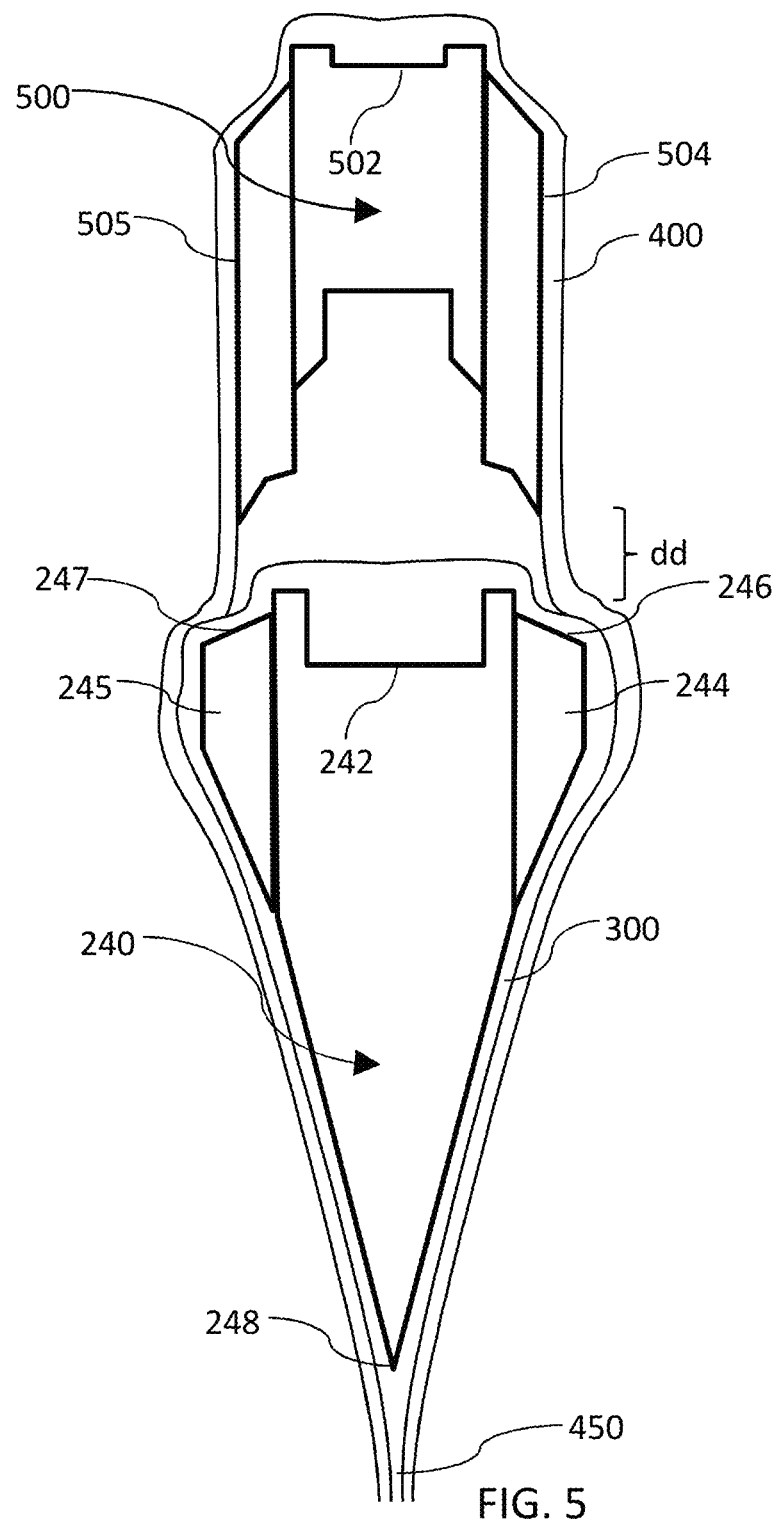
FIG. 5 illustrates a cross-sectional elevation view of an upper clad fusion pipe configured above a lower core fusion pipe according to at least one embodiment disclosed herein, showing molten clad glass dropping and flowing over molten core glass in order to form a laminated glass sheet.

FIG. 5 illustrates a cross-sectional elevation view of an upper clad fusion pipe 500 configured above a lower core fusion pipe 400 according to at least one embodiment disclosed herein. In the embodiment illustrated in FIG. 5, molten clad glass 400 drops and flows over molten core glass 300 in order to form a laminated glass sheet below root 248 of lower core fusion pipe 400. Specifically, upper clad fusion pipe 500 includes a molten clad glass reservoir 502 extending along a length of upper clad fusion pipe 500, a wall 504 on a first side of molten clad glass reservoir 502 and a wall 505 on a second side of molten clad glass reservoir 502. As shown in FIG. 5, when molten clad glass 400 is flowing over the wall 504 on the first side of the molten clad glass reservoir 502, the molten clad glass 400 flowing over the wall 504 on the first side of the molten clad glass reservoir drops onto molten core glass 300 flowing over the weir 244 on the first side of the molten core glass reservoir 242 at a highest upstream contact point and the molten clad glass 400 flowing over the wall 505 on the second side of the molten clad glass reservoir 502 drops onto molten core glass 300 flowing over the weir 245 on the second side of the molten core glass reservoir 242 at a highest upstream contact point, said highest upstream contact points being located directly above the inclined surfaces 246, 247 of the weir.

As further shown in FIG. 5, the weir 244 on the first side of the molten core glass reservoir 242 and the weir 245 on the second side of the molten core glass reservoir 242 converge to form a root 248 at a distance below the reservoir. Molten glass flowing over the weir 244 on the first side of the molten core glass reservoir and molten glass flowing over the weir 245 on the second side of the molten core glass reservoir converge to form a molten glass sheet 450 below the root 248.

The distance molten clad glass 400 falls freely below walls 504, 505 and above the highest upstream contact point between the molten clad glass 400 and the molten core glass 300 is referred to herein as the "drop distance" and shown as dd in FIG. 5.

While FIG. 5 shows an upper clad fusion pipe, it should be understood that embodiments herein include those in which molten clad glass comes from other sources. For example, molten clad glass can be supplied via a slot draw.

While not limited to any particular value, the drop distance can be selected such that, for given molten glass viscosities and flow rates, the flow velocity of the molten clad glass stream and flow velocity of the molten core glass stream are as close as possible at their highest upstream contact point. For example, in certain exemplary embodiments, the molten core and clad glass viscosities can be selected to be different (such as the molten clad glass having a viscosity that is greater than or less than the viscosity of the molten core glass) and, in other exemplary embodiments, the molten core and clad glass viscosities can be selected to be approximately equal. In addition, the flow rate of the molten clad glass can be selected to be greater than, less than, or approximately equal to the flow rate of the molten core glass.

In certain exemplary embodiments, the molten core and clad glass viscosities are selected to be within 25% of each other, such as within 10% of each other, including approximately equal, the flow rate of the molten clad glass is selected to be from 10% to 50% such as from 15% to 25% of the flow rate of the molten core glass and the drop distance is selected to be from 2% to 10%, such as from 3% to 7% of the vertical distance from the highest point reached by molten clad glass as it flows down from a source of molten clad glass (e.g., as it flows over the highest point of walls of a molten clad glass reservoir) and the highest upstream contact point of molten core glass and molten clad glass.

In any of the embodiments set forth, for example, in FIGS. 1B, 2B, 3A-C, 4A-B, and 5, inclined surface (e.g., 206), can be an essentially planar (i.e., non-curved) surface along at least a majority of horizontal distance A, as illustrated in FIG. 4A.

Figure 6A:
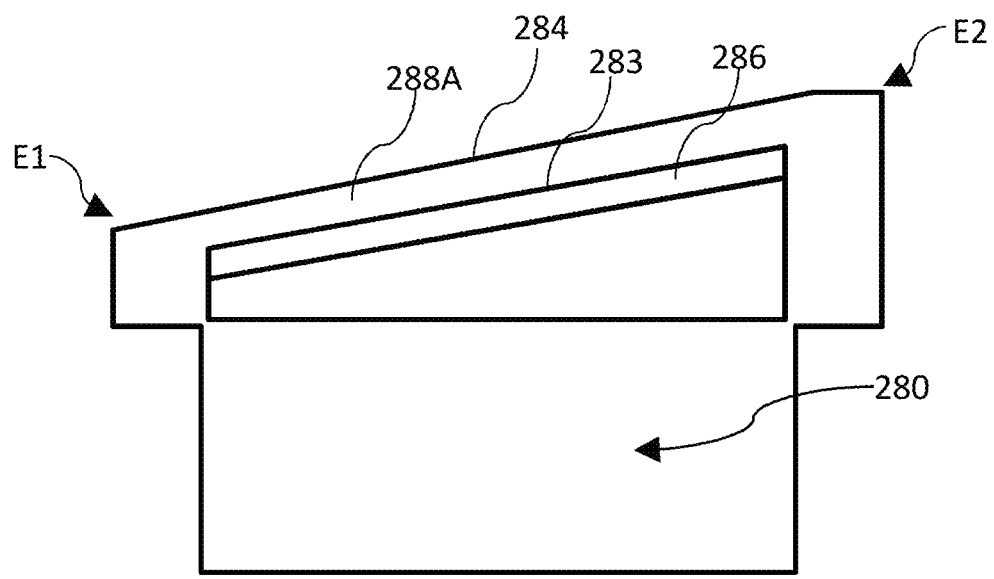
FIGS. 6A and 6B illustrate side perspective views of lower core fusion pipes according to embodiments disclosed herein.
Figure 6B:
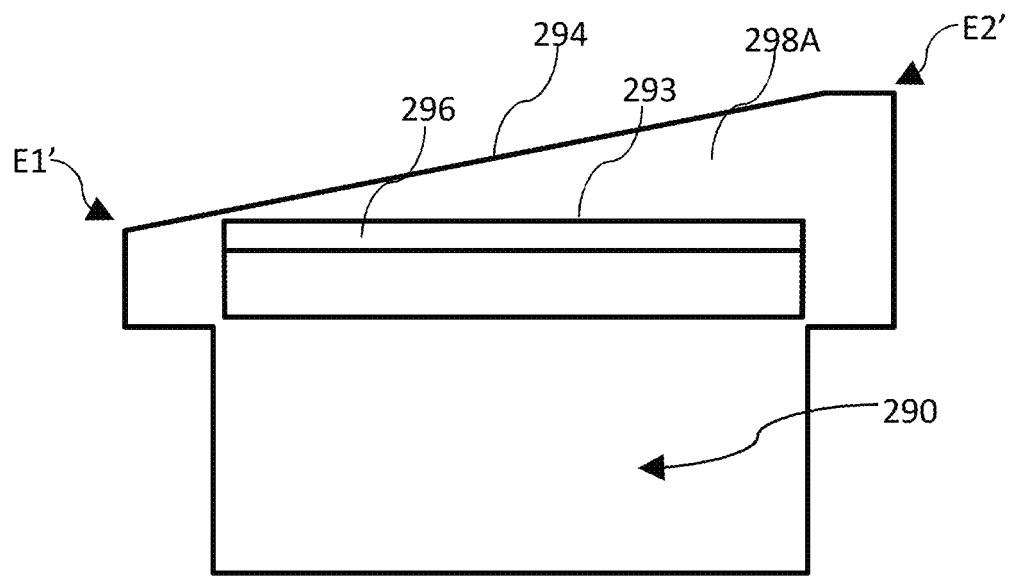

FIGS. 6A and 6B illustrate side perspective views of lower core fusion pipes, respectively 280, 290, according to embodiments disclosed herein. In the embodiment illustrated in FIG. 6A, height of weir 284 increases from a first end E1 to a second end E2 along the length of the weir 284 and the height of the intersection 283 of the inclined surface 286 and the downstep surface 288A increases from first end E1 to second end E2 along the length of the weir 284. While the embodiment shown in FIG. 6A shows a vertical distance between the highest and lowest points of the downstep surface 288A as approximately constant along the length of the weir (i.e., the height of the intersection 283 of the inclined surface 286 and the downstep surface 288A is increasing along the length of the weir at approximately the same degree as the height of the weir 284, such that the height of the weir 284 and intersection 283 are approximately parallel along the length of the weir 284), embodiments herein should be understood to include those in which the height of the intersection 283 of the inclined surface 286 and the downstep surface 288A is increasing along the length of the weir at a degree that is greater or less than the degree the height of the weir 284 is increasing along its length.

In the embodiment illustrated in FIG. 6B, wherein height of the weir 294 increases from a first end E1' to a second end E2' along the length of the weir 294 and the height of the intersection 293 of the inclined surface 296 and the downstep surface 298A does not increase from first end E1' to second end E2' along the length of the weir. In this embodiment, the vertical distance between the highest and lowest points of downstep surface 298A increases along the length of the weir 294 such that the vertical distance between the highest and lowest points of downstep surface 298A nearest E2' is greater than the vertical distance between the highest and lowest points of downstep surface 298A nearest E1'. For example, the vertical distance between the highest and lowest points of downstep surface 298A nearest E2' may be from 1.1 to 10 times, such as from 2 to 5 times the vertical distance between the highest and lowest points of downstep surface 298A nearest E1'.

Embodiments disclosed herein can provide at least one advantage over embodiments disclosed in the prior art, particularly with respect to controlling the relative flow of molten core and clad glass in fusion processes for making glass sheet laminates having two or more layers. For example, in such processes, it is generally desirable to control the flow of the molten core and clad glasses such that their flow velocities are, at their highest upstream contact point, as similar as possible. This enables production of glass sheets having more uniform thickness, lower incidence of flow instability, and lower amounts of undesirable characteristics or deformities such as those caused by air entrapment.

However, in such processes, a variety of factors can add significant complexity to consistently achieving a sufficient velocity profile match. Such factors include, but are not limited to, the drop distance the molten clad glass falls before coming in contact with the molten core glass (generally, the larger the drop distance, the faster the velocity of the molten clad glass, all else being equal), the relative viscosities of the molten core and clad glasses, the relative flow rates of the molten core and clad glasses, relative changes in viscosity of the molten core and clad glasses as a function of temperature, conditions affecting heat transfer characteristics of the molten core and clad glasses (e.g., heat capacity of molten core and clad glasses, emissivity of surrounding environment, thermal conduction and convection characteristics of surrounding environment), surface tension effects.

Embodiments disclosed herein, including a weir with an inclined surface as disclosed herein can, as shown, in FIG. 1B, enable wider velocity profile gradients for the molten core glass that can, in turn, enable a much larger margin for error in matching molten core and molten clad glass velocities. In that regard, for a given molten core and clad glass viscosity and given molten core and clad glass flow rate, the molten clad glass drop distance and the average degree of incline of the inclined surface can be selected such that the flow velocities of the molten core and clad glasses are relatively closely matched both in terms of speed and direction. Under such conditions using embodiments disclosed herein, fluctuations in process conditions, such as those described above, are less likely to substantially affect the match between molten core and molten clad glass velocities.

Embodiments disclosed herein including a stepped surface region between the inclined surface and the molten core glass reservoir, such as those illustrated in FIGS. 3B, 3C, 4B, 5, 6A, and 6B, can also enable greater flow stability by minimizing impedance issues as a result of the confluence of the molten core and clad streams, specifically impedance that can otherwise occur as a result of the confluence of those streams (i.e., highest upstream contact point of the molten core and clad glass) interfering with the flow profile of the molten core stream over the highest point of the weir (e.g., the relatively horizontal surface of the stepped surface region between the inclined surface and the molten core glass reservoir).

Flow stability can be further improved and tuned by, for example, adjusting the viscosity of the core and/or clad streams, tilting the core and/or clad fusion pipes relative to each other, and/or incorporation of adjustable flow diverting baffles near the lower region of the clad fusion pipe as described, for example, in U.S. patent application Ser. No. 13/479,701, the entire disclosure of which is incorporated herein by reference.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A glass sheet forming apparatus comprising:
   a molten core glass reservoir extending along a length of the apparatus;
   a weir on at least a first side of the molten core glass reservoir; and
   a root located at a distance below the weir;
   wherein the weir comprises an inclined surface that, in the intended direction of molten glass flow, slopes linearly downward in the vertical direction while extending away from the molten core glass reservoir in the horizontal direction;
   wherein, along at least one cross section of the weir, a horizontal distance (A) between the closest and farthest points of the inclined surface from the molten core glass reservoir is greater than half a horizontal distance (B) between the molten core glass reservoir and the farthest point of the inclined surface from the molten glass reservoir;
   wherein a source of molten clad glass is configured above the glass sheet forming apparatus such that when molten clad glass is flowing down from the source of molten clad glass and molten core glass is flowing over the weir, the molten clad glass drops onto the molten core glass at a highest upstream contact point, said highest upstream contact point being located directly above the inclined surface of the weir; and
   and wherein the molten core glass and the molten clad glass flowing over the weir form a molten glass sheet below the root.

2. The glass forming apparatus of claim 1 further comprising a weir on a second side of the molten core glass reservoir, wherein the weir on the first side of the molten core glass reservoir and the weir on the second side of the molten core glass reservoir converge to form the root, and wherein molten glass flowing over the weir on the first side of the molten core glass reservoir and molten glass flowing over the weir on the second side of the molten core glass reservoir converge to form a molten glass sheet below the root.

3. The glass forming apparatus of claim 2, wherein the source of molten clad glass comprises a molten clad glass reservoir extending along a length of the source of molten clad glass and a wall on a first side of the molten clad glass reservoir and a wall on a second side of the molten clad glass reservoir, such that when molten clad glass is flowing over the wall on the first side of the molten clad glass reservoir and over the wall on the second side of the molten clad glass reservoir, the molten clad glass flowing over the wall on the first side of the molten clad glass reservoir drops onto molten core glass flowing over the weir on the first side of the molten core glass reservoir at a highest upstream contact point and the molten clad glass flowing over the wall on the second side of the molten clad glass reservoir drops onto molten core glass flowing over the weir on the second side of the molten core glass reservoir at a highest upstream contact point, said highest upstream contact points being located directly above the inclined surfaces of the weir.

4. The glass forming apparatus of claim 1, wherein the weir further comprises a stepped surface region between the inclined surface and the molten core glass reservoir, the stepped surface region comprising a downstep surface having an average degree of incline that is greater than an average degree of incline of the inclined surface.

5. The glass forming apparatus of claim 1, wherein, along at least one cross section of the weir, the inclined surface has an average degree of incline from 5 degrees to 45 degrees.

6. The glass forming apparatus of claim 4, wherein, along at least one cross section of the weir, the inclined surface has an average degree of incline from 5 degrees to 45 degrees and the downstep surface has an average degree of incline from 45 degrees to 90 degrees.

7. The glass forming apparatus of claim 4, wherein, along at least one cross section of the weir, a vertical distance (C) between the highest and lowest points of the downstep surface is greater than a vertical distance (D) between the highest and lowest points of the inclined surface.

8. The glass forming apparatus of claim 7, wherein, along at least one cross section of the weir, a vertical distance (C) between the highest and lowest points of the downstep surface is less than a horizontal distance (A) between the closet and farthest points of the inclined surface from the molten core glass reservoir.

9. The glass forming apparatus of claim 7, wherein, along at least one cross section of the weir, a vertical distance (C) between the highest and lowest points of the downstep surface is greater than a horizontal distance (A) between the closest and farthest points of the inclined surface from the molten core glass reservoir.

10. The glass forming apparatus of claim 4, wherein the height of the weir increases from a first end to a second end along the length of the weir and the height of the intersection of the inclined surface and the downstep surface increases from a first end to a second end along the length of the weir.

11. The glass forming apparatus of claim 4, wherein the height of the weir increases from a first end to a second end along the length of the weir and the height of the intersection of the inclined surface and the downstep surface does not increase from a first end to a second end along the length of the weir.

12. A method of forming glass sheets, the method comprising:
  flowing molten core glass from a molten core glass reservoir extending along a length of a glass sheet forming apparatus over a weir on at least a first side of the molten core glass reservoir;
  flowing molten clad glass down from a source of molten clad glass;
  wherein the weir comprises an inclined surface that, in the intended direction of molten glass flow, slopes linearly downward in the vertical direction while extending away from the molten core glass reservoir in the horizontal direction;
  wherein, along at least one cross section of the weir, a horizontal distance (A) between the closest and farthest points of the inclined surface from the molten core glass reservoir is greater than half a horizontal distance (B) between the molten core glass reservoir and the farthest point of the inclined surface from the molten glass reservoir;
  wherein the source of molten clad glass is configured above the glass forming apparatus such that when molten clad glass is flowing down from the source of molten clad glass and the molten core glass is flowing over the weir, the molten clad glass drops onto the molten core glass at a highest upstream contact point, said highest upstream contact point being located directly above the inclined surface of the weir; and
  wherein the molten core glass and the molten clad glass flowing over the weir form a molten glass sheet below a root located at a distance below the weir.

13. The method of claim 12, wherein the glass forming apparatus further comprises a weir on a second side of the molten core glass reservoir, wherein the weir on the first side of the molten core glass reservoir and the weir on the second side of the molten core glass reservoir converge to form the root at a distance below the reservoir, and wherein molten glass flowing over the weir on the first side of the molten core glass reservoir and molten glass flowing over the weir on the second side of the molten core glass reservoir converge to form a molten glass sheet below the root.

14. The method of claim 13, wherein the source of molten clad glass comprises a molten clad glass reservoir extending along a length of the source of molten clad glass and a wall on a first side of the molten clad glass reservoir and a wall on a second side of the molten clad glass reservoir, such that when molten clad glass is flowing over the wall on the first side of the molten clad glass reservoir and over the wall on the second side of the molten clad glass reservoir, the molten clad glass flowing over the wall on the first side of the molten clad glass reservoir drops onto molten core glass flowing over the weir on the first side of the molten core glass reservoir at a highest upstream contact point and the molten clad glass flowing over the wall on the second side of the molten clad glass reservoir drops onto molten core glass flowing over the weir on the second side of the molten core glass reservoir at a highest upstream contact point, said highest upstream contact points being located directly above the inclined surfaces of the weir.

15. The method of claim 12, wherein the weir further comprises a stepped surface region between the inclined surface and the molten core glass reservoir, the stepped surface region comprising a downstep surface having an average degree of incline that is greater than an average degree of incline of the inclined surface.

16. The method of claim 12, wherein, along at least one cross section of the weir, the inclined surface has an average degree of incline from 5 degrees to 45 degrees.

17. The method of claim 15, wherein, along at least one cross section of the weir, the inclined surface has an average degree of incline from 5 degrees to 45 degrees and the downstep surface has an average degree of incline from 45 degrees to 90 degrees.

18. The method of claim 15, wherein along at least one cross section of the weir, a vertical distance (C) between the highest and lowest points of the downstep surface is greater than a vertical distance (D) between the highest and lowest points of the inclined surface.

19. The method of claim 18, wherein, along at least one cross section of the weir, a vertical distance (C) between the highest and lowest points of the downstep surface is less than a horizontal distance (A) between the closest and farthest points of the inclined surface from the molten core glass reservoir.

20. The method of claim 18, wherein, along at least one cross section of the weir, a vertical distance (C) between the highest and lowest points of the downstep surface is greater than a horizontal distance (A) between the closest and farthest points of the inclined surface from the molten core glass reservoir.

21. The method of claim 15, wherein the height of the weir increases from a first end to a second end along the length of the weir and the height of the intersection of the inclined surface and the downstep surface increases from a first end to a second end along the length of the weir.

22. The method of claim 15, wherein the height of the weir increases from a first end to a second end along the length of the weir and the height of the intersection of the inclined surface and the downstep surface does not increase from a first end to a second end along the length of the weir.

23. The method of claim 15, wherein the method is used to form laminated glass sheets.

* * * * *